(12) United States Patent
Ueno

(10) Patent No.: US 6,717,986 B1
(45) Date of Patent: Apr. 6, 2004

(54) ERROR PROPAGATION DETECTION AND CONTROL METHOD, AND MEMORY DEVICE USING THE SAME

(75) Inventor: Hiroaki Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/442,555

(22) Filed: Nov. 18, 1999

(30) Foreign Application Priority Data

May 19, 1999 (JP) .......................................... 11-139252

(51) Int. Cl.$^7$ ................................................ H03H 7/30

(52) U.S. Cl. .......................... 375/233; 375/350; 333/18; 714/750

(58) Field of Search ................................ 375/233, 229, 375/350; 714/750; 333/18

(56) References Cited

U.S. PATENT DOCUMENTS 5,777,692 A * 7/1998 Ghosh .......................... 348/725
6,141,783 A * 10/2000 Ashley et al. ............... 714/746

* cited by examiner

*Primary Examiner*—Chi Pham
*Assistant Examiner*—Pankaj Kumar
(74) *Attorney, Agent, or Firm*—Greer, Burns & Crain, Ltd.

(57) ABSTRACT

An error propagation detection method and apparatus for use in decision feedback equalization type detection is disclosed, with which it is possible to detect error propagation even when a specific code conversion rule is satisfied in an MDFE system. If the input signal of a comparative decider be a binary signal $a(k)$ expressed as ±1, an error signal $ev(k)$ expressed by $ev(k)=[y(k)-\text{Ideal } y(k)]\,\text{sign}[a(k)]$ is determined using $a(k-1) \neq a(k+1)$ as an error computation condition. The error signal $ev(k)$ thus determined is checked to see whether it exceeds a specific value. If so, the slice level of the comparative decider is controlled to a corresponding offset value.

12 Claims, 18 Drawing Sheets

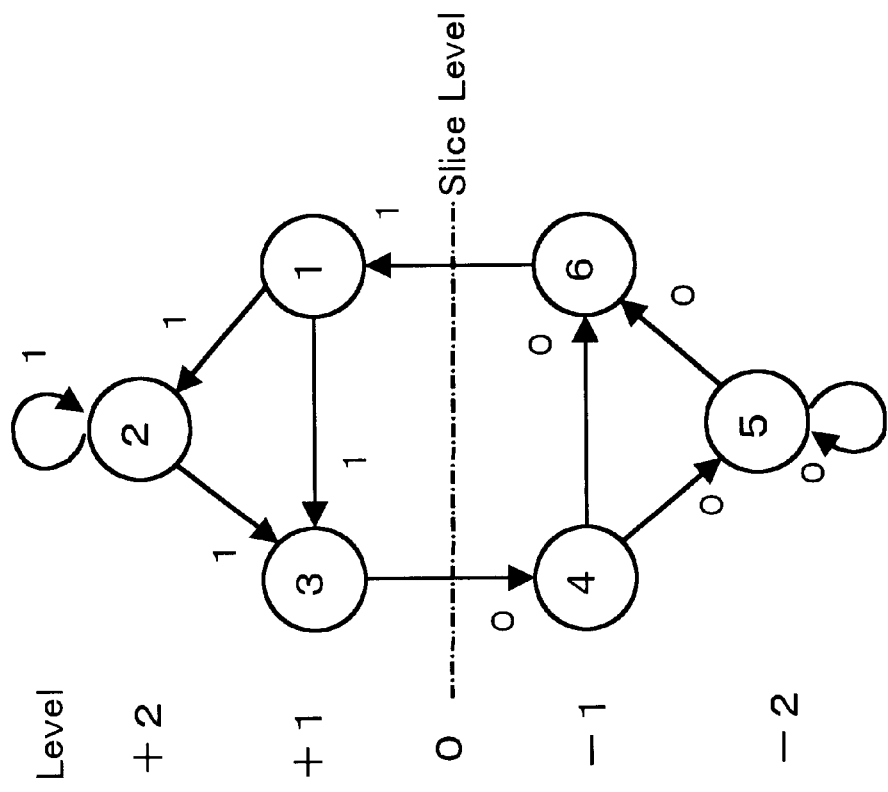

FIG. 3

| Error Propagation Mode | Mode 1 | Mode 2 | Mode 3 |
|---|---|---|---|
| Error Propagation Signal | (diagram with nodes 1-6, +2, +1, -1, Slice, Offset) | (diagram with nodes 1-6, +2, +1, -1, -2, Slice, Offset) | (diagram with nodes 1-6, +2, +1, -1, -2, Slice, Offset) (One or Two Times) |
| Data Pattern | xx xx 0011, 001...1 | x x x x 00011, 000111 | x x x x 000011, 0000111, 0000011 |
| Erroneous Pattern | 1111.... | 10111, 101111 | 100111, 1001111, 1000111 |
| Noise Source | Missing or Excess Signal Random Noise | | Random Noise |
| Detection | K Constant Violation | D Constant Violation | Accumulated Amplitude Error |
| Control | | Slice Level Shift | |

FIG. 4

| Mode 3 Error Propagation Source Pattern | Transition Mode | Number of +1 : −1 at Normal Sequence | Number of +1 : −1 at Error Propagation Mode |
|---|---|---|---|
| No Error 1 1 0 0 0 0 → Error Propagation 1 1 1 0 0 1 | Normal / Error / One Time | 2 : 4 | 4 : 2 |
| No Error 1 1 1 0 0 0 0 → Error Propagation 1 1 1 1 0 0 1 | Normal / Error / One Time | 3 : 4 | 5 : 2 |
| No Error 1 1 0 0 0 0 0 → Error Propagation 1 1 1 0 0 0 1 | Normal / Error / Two Times | 2 : 5 | 4 : 3 |

US 6,717,986 B1

ERROR PROPAGATION DETECTION AND CONTROL METHOD, AND MEMORY DEVICE USING THE SAME

BACKGROUND OF THE INVENTION

1. Field of the Invention

The present invention relates to a method for the detection and control of error propagation based on multilevel decision feedback equalization (MDFE), and to a memory device that makes use of this method.

More particularly, it relates to a method for controlling error propagation by means of the results of error propagation detection and error propagation offset detection involving the detection of the offset direction of a signal due to error propagation.

2. Description of the Related Art

FIG. 15 is a block diagram of the structure of a magnetic disk device that makes use of multilevel decision feedback equalization (MDFE), and of the signal processing system in particular. In FIG. 15, an input NRZ signal composed of 1 and 0 bit strings is converted by a (1-7) encoder into a (1-7) code having a code rule in which the maximum continuance of same-polarity codes is 8 and the number of continuous alternations is 1.

The output of the (1-7) encoder has a value of (plus/minus)1 sampled at a timing of 1/T. With respect to the output of the (1-7) encoder, (1/1-D)mod2 is computed by the write FF circuit 2, sent to the write/read head 3, and written to a disk.

In FIG. 15, the data written to the disk is read by a write/read head 3, and is amplified to a specific level through a head pre-amplifier circuit 4 and an AGC amplifier 5.

The output of the AGC amplifier 5 is inputted to a forward filter 6 of an MDFE circuit 10 and converted into a ternary signal (−2, 0, +1). The output of a feedback filter 7 varies between input pulse polarity and reverse polarity. Specifically, the feedback filter 7 is assumed to be such that the polarity of the input reproduction signal pulses alternates.

Therefore, the output polarity of the feedback filter 7 is usually in the opposite direction from the polarity of the expected input to the forward filter 6. An addition circuit 8 finds the difference between the output of the forward filter 6 and the output of the feedback filter 7. As a result, the output of the addition circuit 8 has a waveform centered around a "0" level.

The output of the addition circuit 8 is then subjected to binary decision by a detector 9. The output of the detector 9 is a binary coded sequence, and is put in a quaternary state by 1-bit convolution by the MDFE circuit 10.

A (1-D)mod2 circuit 11 performs computation for write FF circuit 2 processing and inverse processing (1-D)mod 2, and decodes the (1-7) code by means of a (1-7) decoder 12. This results in the reproduction of the read signal.

Thus, the structure in decision feedback equalization is such that the decision results from the detector 9 are fed back to the input side through the feedback filter 7. This poses a problem in that an erroneous decision results in the propagation of the error.

One possible way to deal with this problem, as previously proposed by the inventors (PCT/98JP/05278), is to use a code conversion rule (d, k) to detect the occurrence of error propagation in decision feedback equalization, and make the slice level of a comparative decider 9 variable, so that error propagation is minimized.

FIGS. 16A and 16B are diagrams illustrating an example of when the polarity remains the same for nine or more continuous symbols. FIG. 16A is a write data string. In contrast, FIG. 16B is a signal string that has been read, and is a case in which the signal is missing at the $100^{th}$ sample. When a signal is missing, the output of the detector 9 remains fixed at a constant level.

In the example in FIGS. 16A and 16B, the error propagates from the point of the missing signal at the $100^{th}$ sample, and the output of the detector 9 continues fixed at the same polarity of −1.

Meanwhile, FIGS. 17A and 17B are diagrams illustrating an example of continuous polarity alternations for two or more symbols. FIG. 17A is a write data string. In contrast, FIG. 17B is a signal string that has been read, and is a case in which the signal is missing at the $100^{th}$ sample.

In the example in FIG. 17, the error propagates from the point of the missing signal at the $100^{th}$ sample, and the output of the detector 9 is such that ten samples are fixed at +1 (interval I in FIG. 17B), and this is followed by a repeating cycle of polarity alternations of two or more continuous symbols (interval II in FIG. 17B).

The error in the read code strings illustrated in FIGS. 16 and 17 is a code pattern that violates the code conversion rule (d, k). The propagation of error caused by this d constraint violation and k constraint violation can be suppressed by the method disclosed in the previous application (PCT/98JP/05278).

However, further study by the inventors has revealed that error propagation which occurs when the code conversion rule is satisfied cannot be detected and suppressed by the method proposed in the above-mentioned previous application.

An example of this is illustrated in FIGS. 18A through 18C. FIG. 18A illustrates the comparative decider input of the detector (solid line) and the decider slice level (dotted line). FIG. 18B illustrates the direct current offset error level. FIG. 18C illustrates the AGC error signal level.

In this example, when there is no error propagation, the pattern is a continuous "110000," but when error propagation occurs, it is found to be a continuous pattern of "111001."

SUMMARY OF THE INVENTION

An object of the present invention is therefore to provide an error propagation detection method and apparatus for use in decision feedback equalization type detection, with which it is possible to detect error propagation even when a specific code conversion rule is satisfied in an MDFE system.

The constitution of the present invention for achieving the stated object involves multilevel decision feedback equalization in which the output of a comparative decider for deciding the level of an input signal is fed back to the input side through a feedback filter using a slice level as a reference, and the difference signal between the input signal and the feedback signal or a signal produced by inverting the feedback signal and adding it to the input signal is inputted to the comparative decider.

The present invention is characterized in that error propagation is detected from the input signal of the above-mentioned comparative decider and from the decision results of the comparative decider, the direction of the error propagation offset is detected from the decision results of the comparative decider, and as a result, the offset of the slice level of the comparative decider is controlled so as to be canceled out, or the DC level of the comparative decider input is controlled so as to cancel out the offset, which suppresses error propagation.

A first preferred aspect of the present invention is characterized in that, if we let the input signal of the above-mentioned comparative decider be y(k) and the output signal of said comparative decider be a binary signal a(k) expressed as ±1, then an error signal ev(k) expressed by ev(k)=[y(k)−Ideal y(k)]·sign[a(k)] is determined using a(k−1)≠a(k+1) as an error computation condition, and the error signal ev(k) thus determined is checked to see whether it exceeds a specific value. If it is detected that the above-mentioned error signal ev(k) exceeds this specific value, the slice level of the above-mentioned comparative decider is controlled to a corresponding offset value.

A second preferred aspect of the present invention is characterized in that, in the first aspect, the above-mentioned error signal ev(k) is accumulated for a plurality of samples that satisfies the error computation condition a(k−1)≠a(k+1), and if the cumulative value exceeds the above-mentioned specific value, the slice level of the above-mentioned comparative decider is controlled to a corresponding offset value.

A third preferred aspect of the present invention is characterized in that, in the first aspect, the above-mentioned error signal ev(k) is averaged for a plurality of samples that satisfies the error computation condition a(k−1)≠a(k+1), and if the average value exceeds the above-mentioned specific value, the slice level of the above-mentioned comparative decider is controlled to a corresponding offset value.

A fourth preferred aspect of the present invention is characterized in that, if we let the input signal of the above-mentioned comparative decider be y(k) and the output signal of said comparative decider be a binary signal a(k) expressed as ±1, then an oscillation error signal is computed using a(k−1)≠a(k+1) as an oscillation error computation condition, and the oscillation error signal thus computed is checked to see whether it exceeds a specific value. If it is detected that the above-mentioned oscillation error signal exceeds this specific value, the slice level of the above-mentioned comparative decider is controlled to a corresponding offset value.

A fifth preferred aspect of the present invention is characterized in that, in the above-mentioned fourth aspect, the above-mentioned oscillation error signal computed using the above-mentioned oscillation error computation condition is accumulated for a plurality of samples, and if the cumulative value exceeds a specific comparison reference value, the slice level of the above-mentioned comparative decider is controlled to a corresponding offset value.

A sixth preferred aspect of the present invention is characterized in that, in the above-mentioned fourth aspect, the above-mentioned oscillation error signal computed using the above-mentioned oscillation error computation condition is averaged for a plurality of samples, and if the average value exceeds a specific comparison reference value, the slice level of the above-mentioned comparative decider is controlled to a corresponding offset value.

A seventh preferred aspect of the present invention is characterized in that, in the above-mentioned first or fourth aspect, a +1 or −1 majority decision is made for the output bits from the above-mentioned comparative decider, and the offset direction of the above-mentioned input signal is decided from the results of the above-mentioned majority decision. The slice level of the above-mentioned comparative decider is controlled to a corresponding offset value in the opposition direction from the above-mentioned decided offset direction.

An eighth preferred aspect of the present invention is characterized in that, in the above-mentioned first or fourth aspect, a +1 or −1 majority decision is made for one cycle of output bits from the above-mentioned comparative decider, and the offset direction of the above-mentioned input signal is decided from the results of the above-mentioned majority decision. The slice level of the above-mentioned comparative-decider is controlled to a corresponding offset value in the opposition direction from the above-mentioned decided offset direction.

A ninth preferred aspect of the present invention is characterized in that the squared difference or the difference between the above-mentioned input signal and an ideal signal inferred from the decision results of the comparative decider is determined, these squared difference signals or difference signals are accumulated between a plurality of samples, and a cumulative squared difference signal or cumulative difference signal is determined. The above-mentioned cumulative squared difference signal or cumulative difference signal is checked to see whether it exceeds a specific value, and if it is detected that the cumulative squared difference signal or cumulative difference signal exceeds this specific value, slice level of the above-mentioned comparative decider is controlled to a corresponding offset value.

A tenth preferred aspect of the present invention is characterized in that the squared difference or the difference between the above-mentioned input signal and an ideal signal inferred from the decision results of the comparative decider is determined, and a signal is determined for which the polarity of the decision results of the above-mentioned comparative decider has been crossed with the above-mentioned squared difference or difference signal. These signals for which the polarity has been crossed with the above-mentioned squared difference or difference signal are then accumulated over a specific sample interval, and if the absolute value of the above-mentioned accumulated values exceeds a specific value, the slice level of the above-mentioned comparative decider is controlled to a corresponding offset value.

Further characteristics of the present invention will become clear from the embodiments of the present invention which are described through reference to the figures below.

BRIEF DESCRIPTION OF THE DRAWINGS

FIG. 2A and FIG. 2B are diagrams of the relationship between a state transition in an MDFE system, the input signal of the comparative decider 9 produced by erroneous decision, and the decider slice level;

FIG. 3 illustrates the relationship between error propagation mode and state transition;

FIG. 4 is a diagram illustrating three types of data pattern with a high incidence of error propagation that pertain to the present invention;

DESCRIPTION OF THE PREFERRED EMBODIMENTS

Embodiments of the present invention will now be described through reference to the figures. In the figures, components that are the same or similar are labeled with the same reference labels or numbers.

At this point we will discuss the characteristics of error propagation in an MDFE system for the sake of a proper understanding of the present invention.

Figure 1:
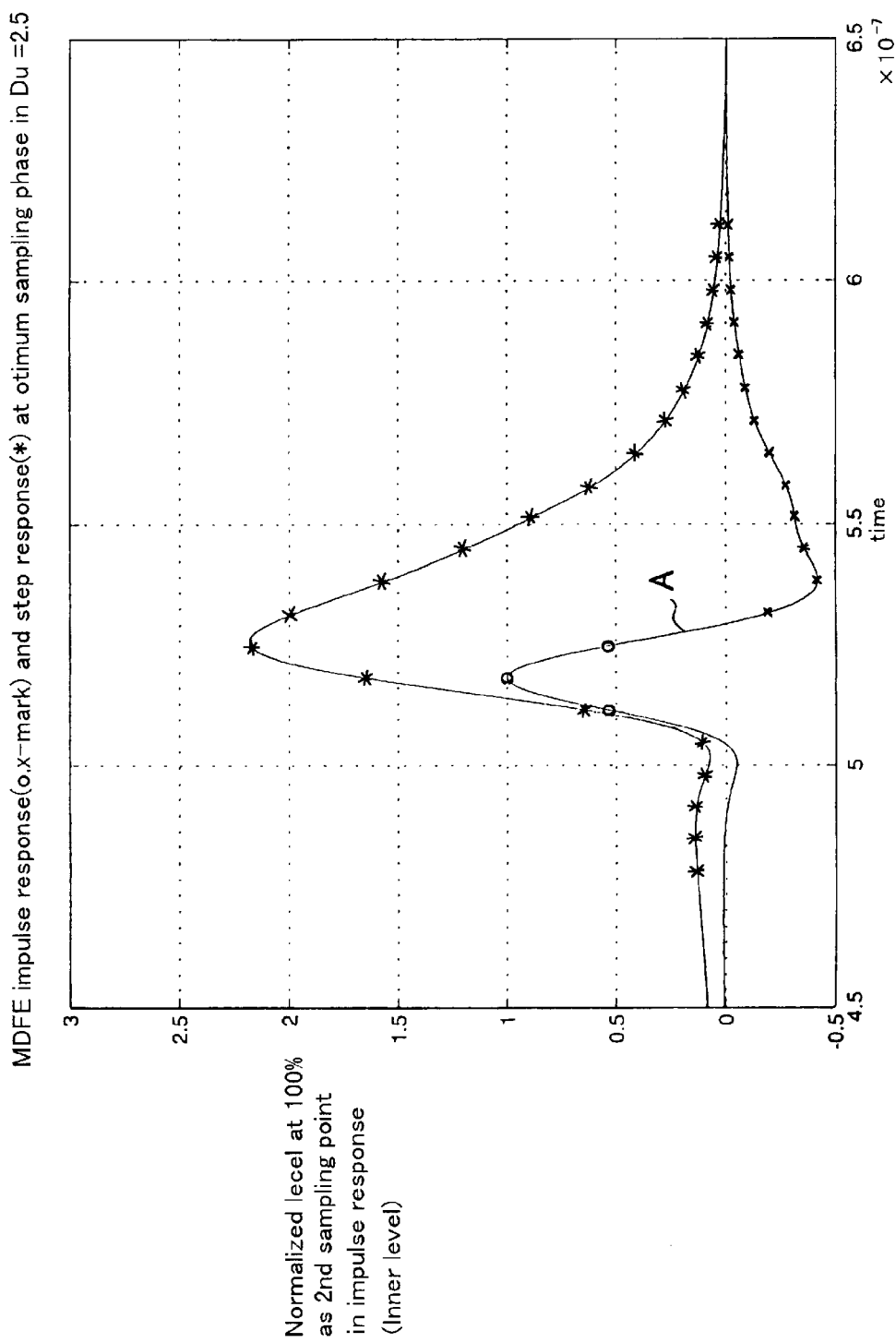
FIG. 1 is a diagram illustrating the impulse response of a read signal.
Figure 15:
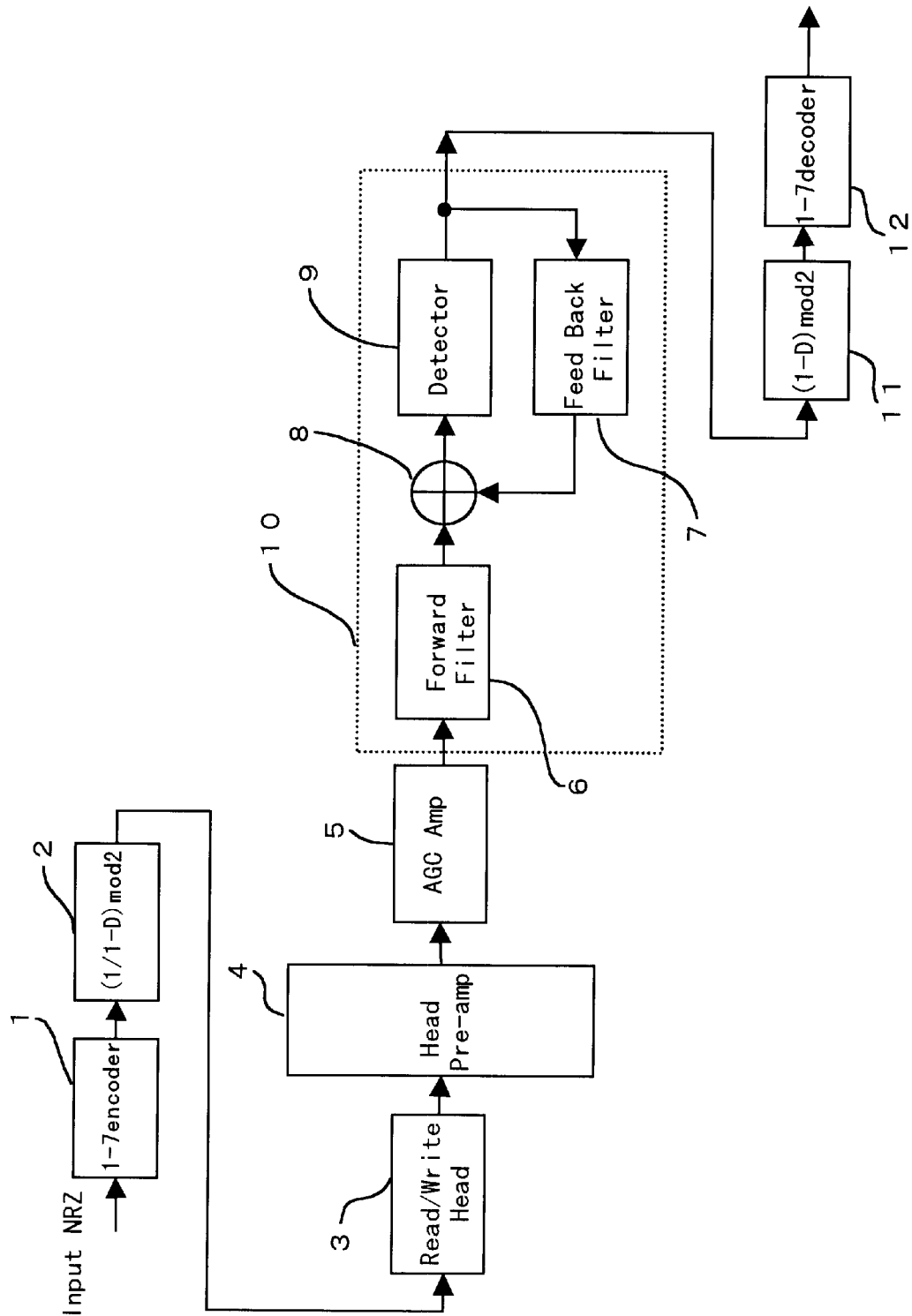
FIG. 15 is a block diagram of the structure of a magnetic disk device that makes use of multilevel decision feedback equalization (MDFE), and of the signal processing system in particular.
Figure 16A:
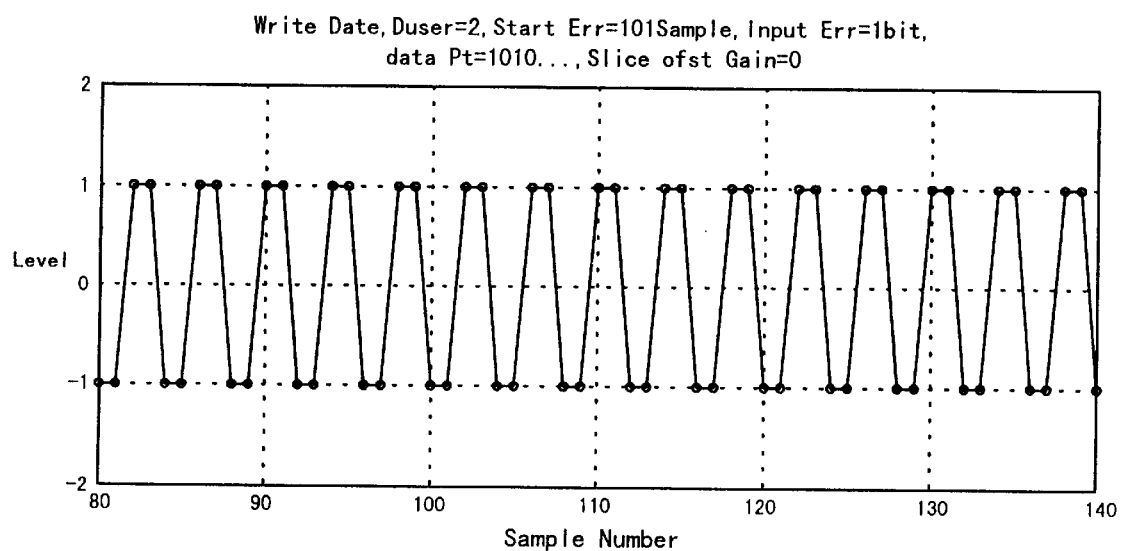
FIGS. 16A and 16B are diagrams illustrating an example of when the polarity remains the same for nine or more continuous symbols.
Figure 16B:
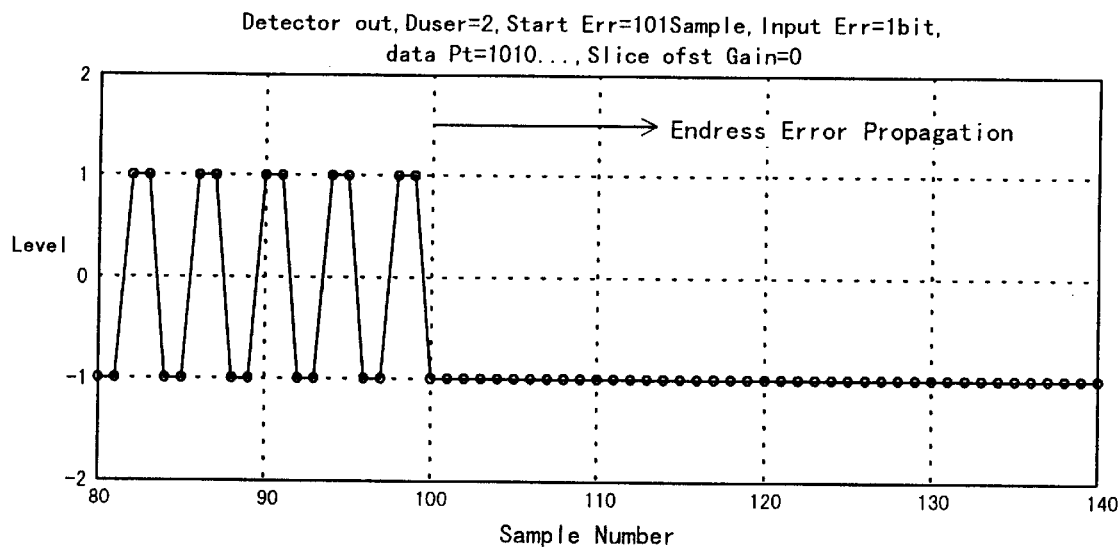
Figure 17A:
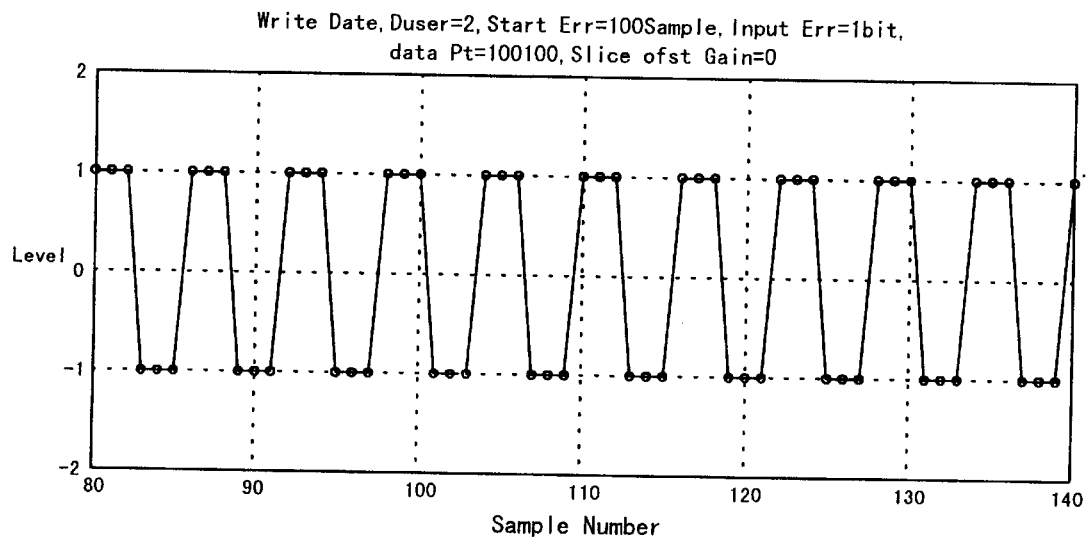
FIGS. 17A and 17B are diagrams illustrating an example of continuous polarity alternations for two or more symbols.
Figure 17B:
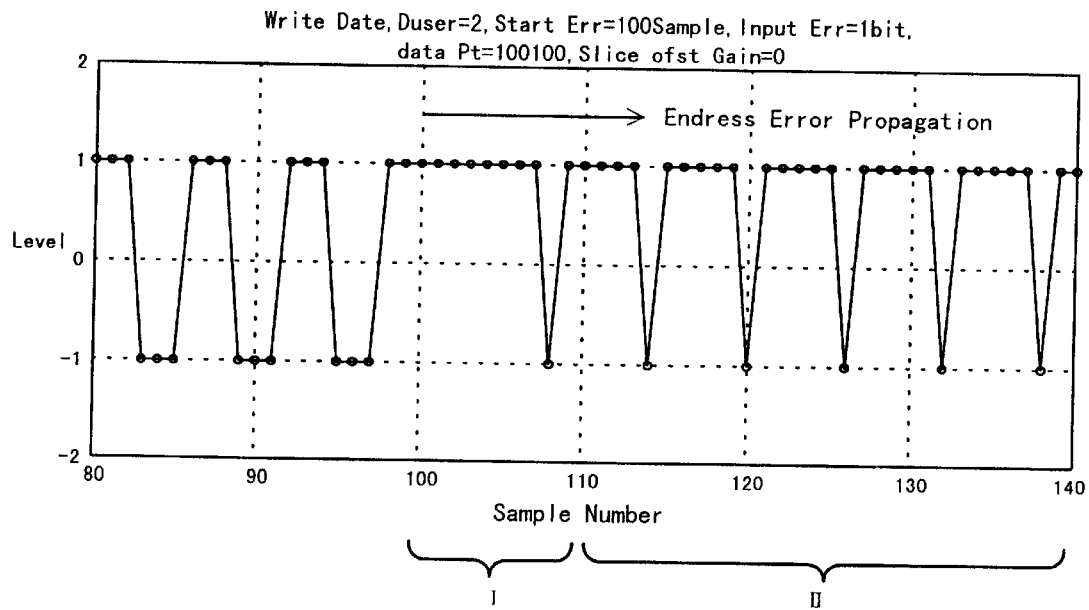

Error propagation occurs when an erroneous value produced by an erroneous decision in the comparative decider 9 in FIG. 15 is fed back to the comparative decider 9 as a feedback value. Fortunately, however, in an MDFE system, a level (X mark) below zero for the read waveform impulse response A indicated by dibits in FIG. 1 is a feedback coefficient.

Accordingly, a feedback value with an erroneous decision by the error comparative decider 9 becomes unipolar, and the input signal in error propagation appears as an offset in one direction.

Therefore, a method in which the slice level of the comparative decider 9 is offset in one direction according to the results of detecting the error propagation due to violation of the code conversion rule, or a method in which an addition is made to the input signal of the comparative decider 9 as a DC offset, was used as the above-mentioned error propagation suppression method proposed in the previous application.

Error propagation can also be suppressed by the same means in the present invention.

The relationship between a state transition in an MDFE system, the input signal of the comparative decider 9 produced by erroneous decision, and the decider slice level is illustrated in FIG. 2.

A characteristic of the input of the MDFE comparative decider 9 here is that the ideal (noiseless) input signal has a quaternary value, and the level thereof is such that if "0" is the center point as shown in FIG. 2A, and if the inside level is +1, the outside level will be +2.

The relationship between the input signal of the comparative decider 9 produced by an erroneous decision and the decider slice level is shown in FIG. 2B. If a decision of +1 is erroneously decided as −1, and bit 1 is decided as bit 0, the slice level will approach the +1 side and move away from the −1 side. There is therefore a greater probability that +1 will be mistaken as −1 in the next decision.

Thus, in the state transition diagram of FIG. 2A, there is a higher probability that the inside level of ③ or ① will be decided erroneously. A requirement for error propagation to occur is that the decider slice level exceed the range of the ±1 level of the decider input signal.

The above-mentioned requirement is not satisfied with a 1-bit error because the feedback coefficient (the portion of the data of impulse response A in FIG. 1) is limited to be less than 0.5 with MDFE.

For example, when there is a 1-bit erroneous decision mistaking +1 for −1, the feedback value would ordinarily be a maximum of "less than −0.5," but because of the erroneous decision, the feedback value is "less than +0.5," and a value totaling "less than +1", is erroneously fed back to the input because of the erroneous decision.

However, the erroneous feedback value does not satisfy the above-mentioned requirement (exceeding a level of ±1) because it is "less than +1." Therefore, there must be at least two bits within the data that is fed back. In other words, this is when the slice level is at least ① or ③ or no more than ④ or ⑥ in FIG. 2A.

FIG. 3 illustrates the relationship between this error propagation mode and state transition. Here, the error propagation mode 1 indicates error propagation when the same code violates the k constraints of at least nine symbols in the case of a decision result that is a (1, 7) code, and error propagation mode 2 indicates error propagation when the continuous code polarity alternation length violates the d constraints of at least two symbols in the case of a decision result that is a (1, 7) code.

Furthermore, in FIG. 3, error propagation mode 3 indicates error propagation in a state in which the (d, k) code limits of the present invention are satisfied.

Let us at this point discuss a case when a "0," which is the correct decision result (data pattern), is erroneously decided to be a "1." As an example, let us assume a case in which the correct decision result of "000011" is incorrect in its first and fourth bits from the left, resulting in an erroneous pattern of "100111."

This is just one error propagation pattern that satisfies the (d, k) code limits of the present invention. The pattern "000011" here is a pattern of ④→⑤→⑤→⑥→①→③ indicated as error propagation signals of mode 3 in the signal state transition diagram in FIG. 3.

④ and ⑥ are supposed to be −1, but are erroneously decided to be +1. This is because the decider slice level is located between levels "−1" and "−2." An error propagation of "1001111" occurs as a result.

A characteristic of such error propagation is that the decider slice level is located within the region of +1 and +2 or within the region of −1 and −2 of the decider input signal. Thus, the distance on the inside of the decider input signal from the decider slice level at zero noise when there is no error propagation is "+1," but the same distance becomes an average of "+0.5" when error propagation has occurred, so there is a clear difference in the distance (amplitude).

The inside of the decider input signal here is the closest decision result of "+1" and "−1" to the decider slice level in the state transition diagram. When there is no error propagation this means state transition ①or ③ and ④ or ⑥, and with error propagation means ② and ① or ③ when the decider slice level is located within the region of ② and ① or ③, or ⑤ and ④ or ⑥ when the decider slice level is located within the region of ② and ① or ③.

As can be seen from the state transition diagrams, these refer to the state of the decider input signal immediately before and after the slice level is crossed. Because the code conversion rule is d=1 with MDFE, the decision result continues at the same polarity for two or more times.

Thus, if the decision result after the decider slice level has been crossed is a(k+1), then the decision result a(k) immediately prior thereto is a(k)≠a(k+1). The decision result a(k−1) one clock pulse earlier can be expressed as a(k−1) ≠a(k+1).

Therefore, the detection of this error propagation involves computing the amplitude or oscillation from the slice level of the decider input signal y(k) corresponding to a(k) when the decider result a(k+1) is different from the decider result a(k−1) two clock pulses earlier, as shown in Formula 1 below.

If we take the difference from the ideal value y(k) (Ideal y(k)) when there is no noise, the oscillation from the slice level is an average of zero when there is no error propagation, and is an average of 0.5 when there is error propagation.

$$ev(k)=\{y(k)-Ideal\ y(k)\}\cdot sign\{a(k)\}\ at\ a(k-1)\ not\ equal\ a(k+1) \quad (1)$$

It is therefore possible to detect error propagation by using the error signal ev(k) of the above formula.

Incidentally, the above formula (1) is equivalent to the oscillation error computation formula, which is commonly used with an MDFE system (see Design, Implementation, and Performance Evaluation of an MDFE Read Channel, 1997).

Therefore, the oscillation error computation result can be used directly for the detection of this error propagation.

It is also effective to use the error signal ev(k) or a value obtained by integrating a plurality of error signals for which equivalent oscillation computation result satisfies the condition of a(k−1)≠a(k+1) in order to lower the probability of error propagation mis-detection.

Another means that can be employed is the use of an average value, since it is conceivable that the signal value might be too large with the above-mentioned integrated error signal.

Error propagation can be stably detected under low error propagation mis-detection conditions by comparing the error signal ev(k) or the integral or average of oscillation error signals thus determined.

The AGC oscillation error signal when the error signal ev(k) was used is shown at the bottom in FIG. 18 (discussed above). When error propagation occurs as above, the error signals (beginning with the twentieth sample on the horizontal axis) are computed in the minus direction.

It is effective to add a direct current offset to the decider slice level offset or the decider input signal employed in the invention of the above-mentioned previous application as a process in the detection of error propagation.

In this case the offset direction must be set. FIG. 4 illustrates the method for this. In FIG. 4, there are three types of data pattern with a high incidence of error propagation that pertain to the present invention.

The top example is a case when the data pattern "110000" has become "111001" due to error propagation, and corresponds to a case when the slice level is offset downward, or put another way, when the signal is offset upward.

The ratio of samples above and below the slice level is 2:4 if there is no error propagation and 4:2 is there is error propagation. The number above is larger after error propagation, becoming the same as the offset direction of the signal.

With the example shown in the middle, in which "1110000" becomes "1111001" due to error propagation, the sample ratio is 3:4 with no error propagation and 5:2 with error propagation. Just as mentioned above, the number above is larger after error propagation, and the signal is also offset in the same direction.

When the error propagation is from "1100000" to "1110001" as shown at the bottom, the sample ratio is 2:5 and 4:3, with the number above being larger after error propagation, and the signal is also offset in the same direction.

It can thus be seen that when error propagation occurs, the signal is offset to whichever side the slice level is larger on, namely, above (+1) or below (−1), in the decision result in the error propagation state.

Therefore, it is possible to detect the input signal offset direction due to error propagation by taking the majority of +1 or −1 in the decision result during the detection of error propagation. It is possible to suppress error propagation by offsetting the comparator slice level in the detected direction or by adding the DC offset value in the opposite polarity of the majority to the different circuit input signal.

Thus using the comparator input error signal ev(k) or oscillation error signal makes it possible to detect error propagation that could not be detected with the above-mentioned invention of the previous application. Also, by taking the majority of the decision result, it is possible to detect the offset direction of the input signal during error propagation, and error propagation can be suppressed by using the error propagation suppression method of the above-mentioned invention of the previous application.

Figure 5:
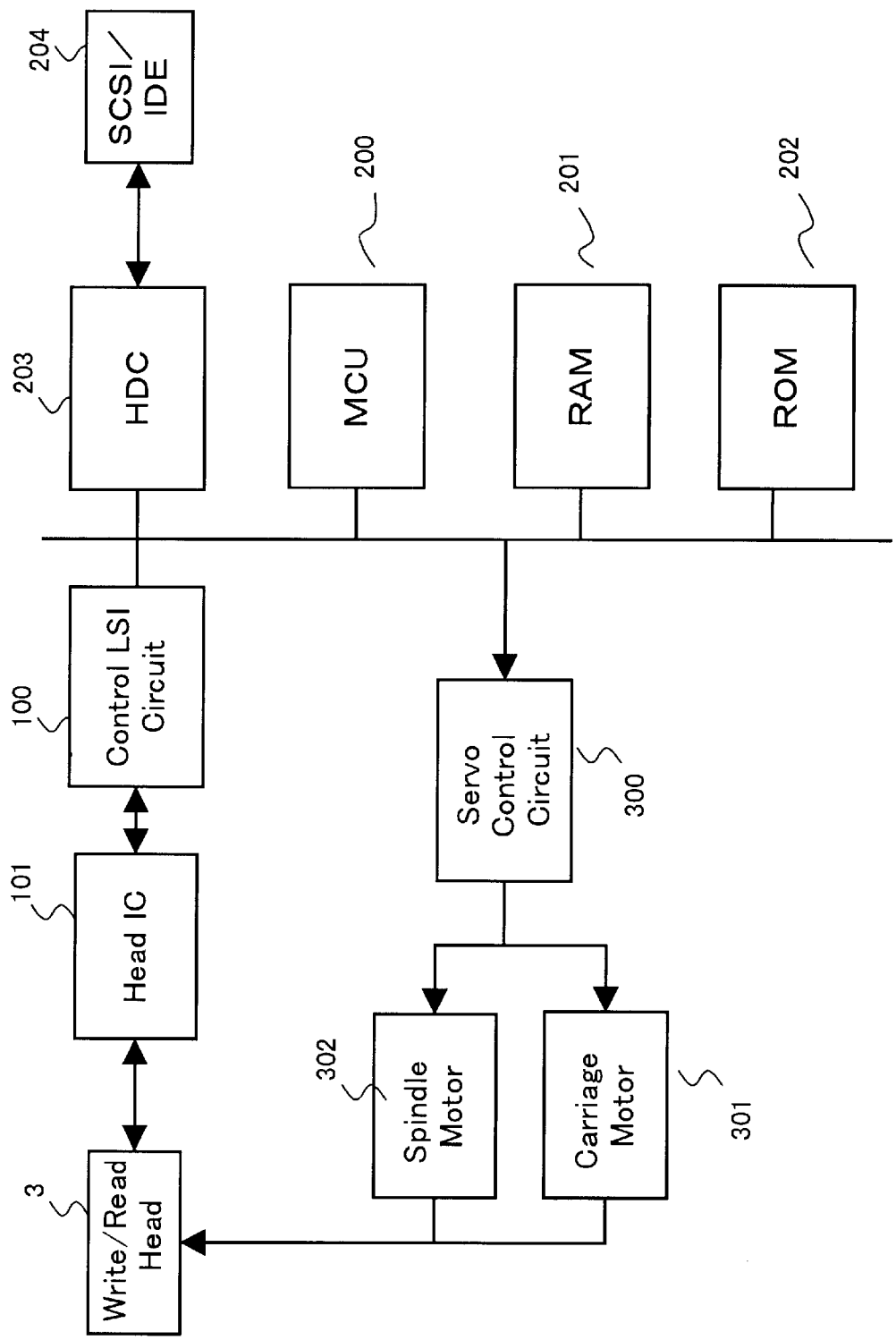
FIG. 5 is a block diagram illustrating an example of the structure of a magnetic recording and reproduction device to which the present invention is applied.

FIG. 5 is a block diagram illustrating an example of the structure of a magnetic recording and reproduction device to which the present invention is applied.

In an actual device, the circuit that serves to detect and suppress error propagation in the multilevel decision feedback equalization of the present invention can be configured as a control LSI circuit 100.

The entire device is controlled by a microcontroller 200, which has a work RAM 201 and a ROM 202 storing a control program. The positional control of the write/read head 3 in the focusing direction and tracking direction is performed by a carriage motor 301 and a spindle 302, each of whose drive is controlled by a servo control circuit 300.

The data that is written to or read from a recording medium goes back and forth to and from a hard disk device (not shown) through an interface 204, such as an SCSI or IDE, by means of a hard disk controller 203.

As compared to FIG. 15, the functions corresponding to the head pre-amplifier circuit 4 and the AGC amplifier 5 are realized by a head IC 101 in FIG. 5. The control LSI circuit 100 includes other functions besides those illustrated in FIG. 5, namely, a (1-7) encoder 1, a (1/1-D)mod 2 circuit 2, the (1-D) mod 2 circuit 11, and the (1-7) decoder 12.

Figure 6:
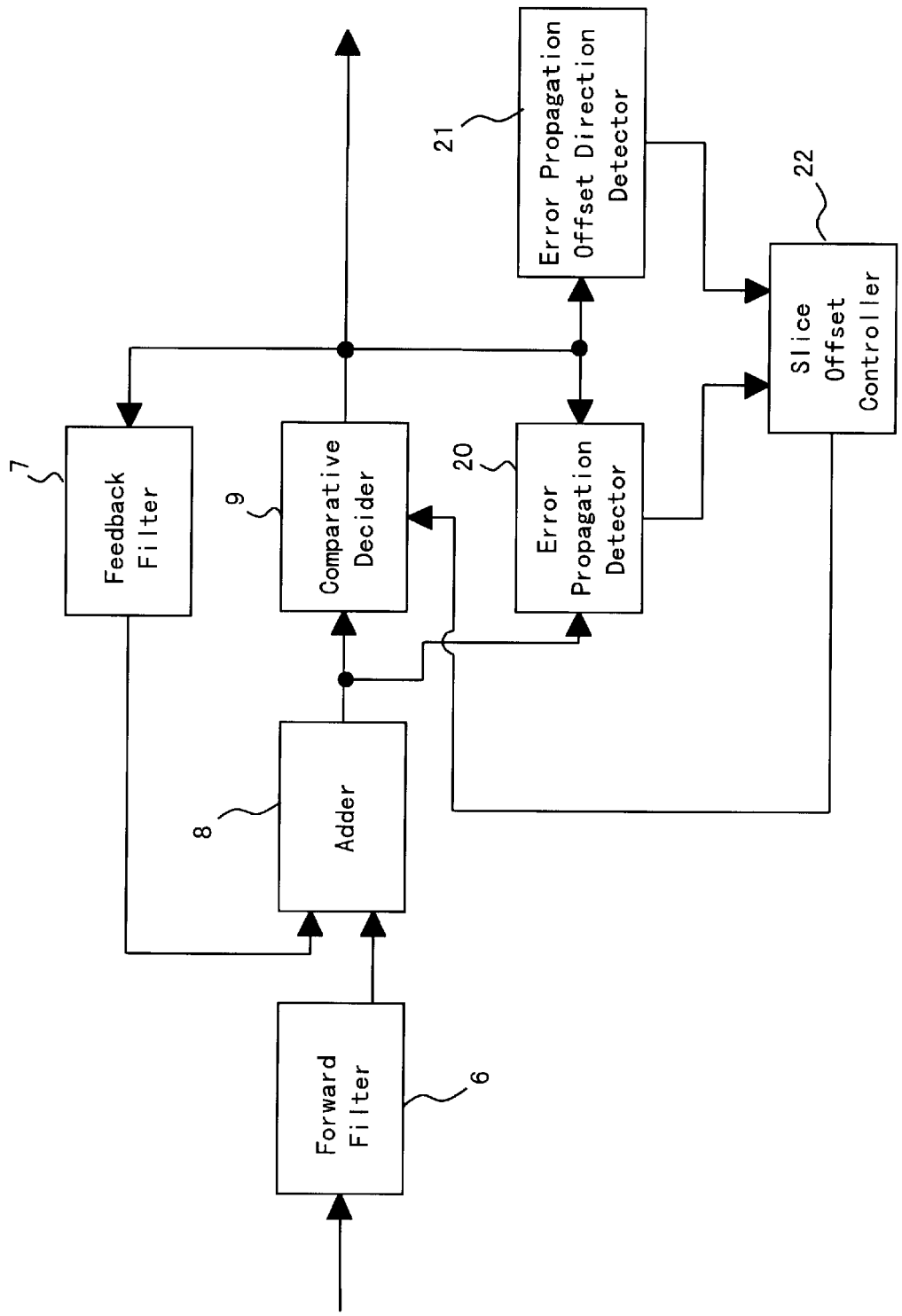
FIG. 6 is a block diagram of an embodiment of the present invention of the member corresponding to the MDFE circuit 10 in FIG. 15, which is an MDFE circuit that serves as a constituent element of the control LSI circuit in FIG. 5.

FIG. 6 is a block diagram of an embodiment of the present invention of the member corresponding to the MDFE circuit 10 in FIG. 15, which is an MDFE circuit that serves as a constituent element of the control LSI circuit in FIG. 5.

In contrast to the MDFE circuit 10 in FIG. 15, this structure of FIG. 6 is characterized by having an error propagation detector 20 for detecting error propagation from the output of the adder 8, and an error propagation offset direction detector 21 for detecting error propagation from the output of the comparative decider 9.

There is also a slice offset controller 22 for producing and outputting the slice offset value of the comparative decider 9 on the basis of the output of the error propagation detector 20 and the error propagation offset direction detector 21.

Figure 7:
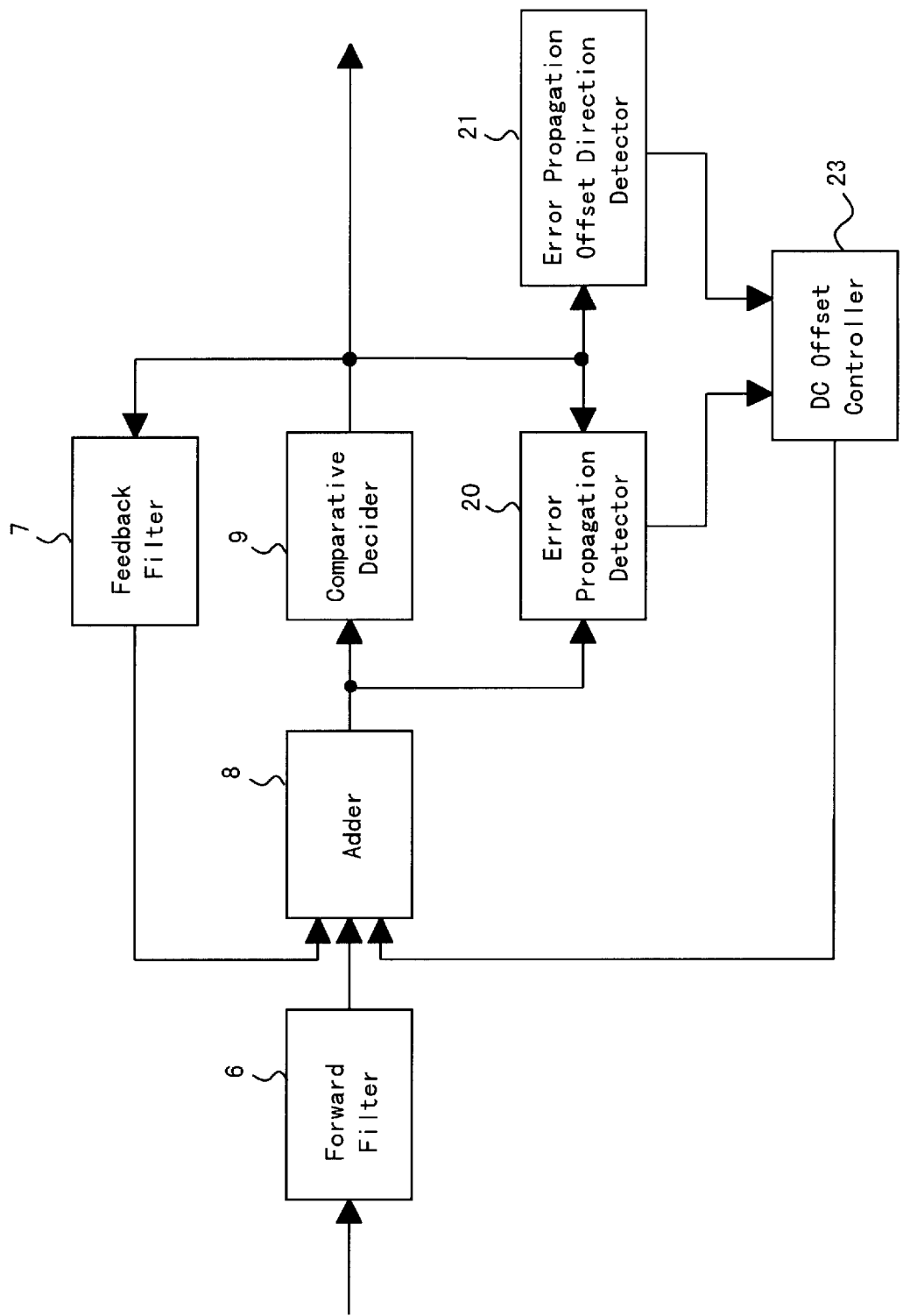
FIG. 7 is a diagram of a structure in which the DC offset value of the adder 8 is controlled, which is in contrast to the embodiment illustrated in FIG. 6.

FIG. 7 shows a structure in which the DC offset value of the adder 8 is controlled on the basis of the output of the error propagation detector 20 and the error propagation offset direction detector 21, which is in contrast to the embodiment illustrated in FIG. 6. Therefore, with the structure in FIG. 7, there is a DC offset controller 23 for producing a DC offset value that is added to the adder 8, instead of the slice offset controller 22 in the structure illustrated in FIG. 6.

In FIGS. 6 and 7, the output of the forward filter 6 and the output of the feedback filter 7 are inverted and inputted to the adder 8. There is also a function whereby these are added. Therefore, the adder 8 outputs the difference between the output of the forward filter 6 and the output of the feedback filter 7, and inputs this to the comparative decider 9.

The comparative decider 9 compares and decides the level of the input of the comparative decider 9, and outputs the binarized result as "1" or "0." The decision result of the comparative decider 9 is inputted to the error propagation detector 20 along with the input signal to the comparative decider 9. The decision result of the comparative decider 9 is further inputted to the error propagation offset direction detector 21.

The propagation of an error is detected by the error propagation detector 20. Meanwhile, the direction of offset (described above), which is the cause of the detected error propagation, is detected by the error propagation offset direction detector 21.

Therefore, in FIG. 6, the slice level of the comparative decider 9 is controlled so that the offset will be zero by the slice offset controller 22 on the basis of the error propagation detected by the error propagation detector 20 and the offset direction detected by the error propagation offset direction detector 21.

Similarly, in FIG. 7, a direct current (DC) is applied so that the offset of the DC level of the adder 8 output will be zero by the DC offset controller 23 on the basis of the error propagation detected by the error propagation detector 20 and the offset direction detected by the error propagation offset direction detector 21.

Regardless of which of the above structures in FIGS. 6 and 7 is used, error propagation is suppressed by controlling the system such that error propagation is detected and the offset of the slice level of the comparative decider 9 or that of the DC level of the adder 8 is canceled out.

Figure 8:
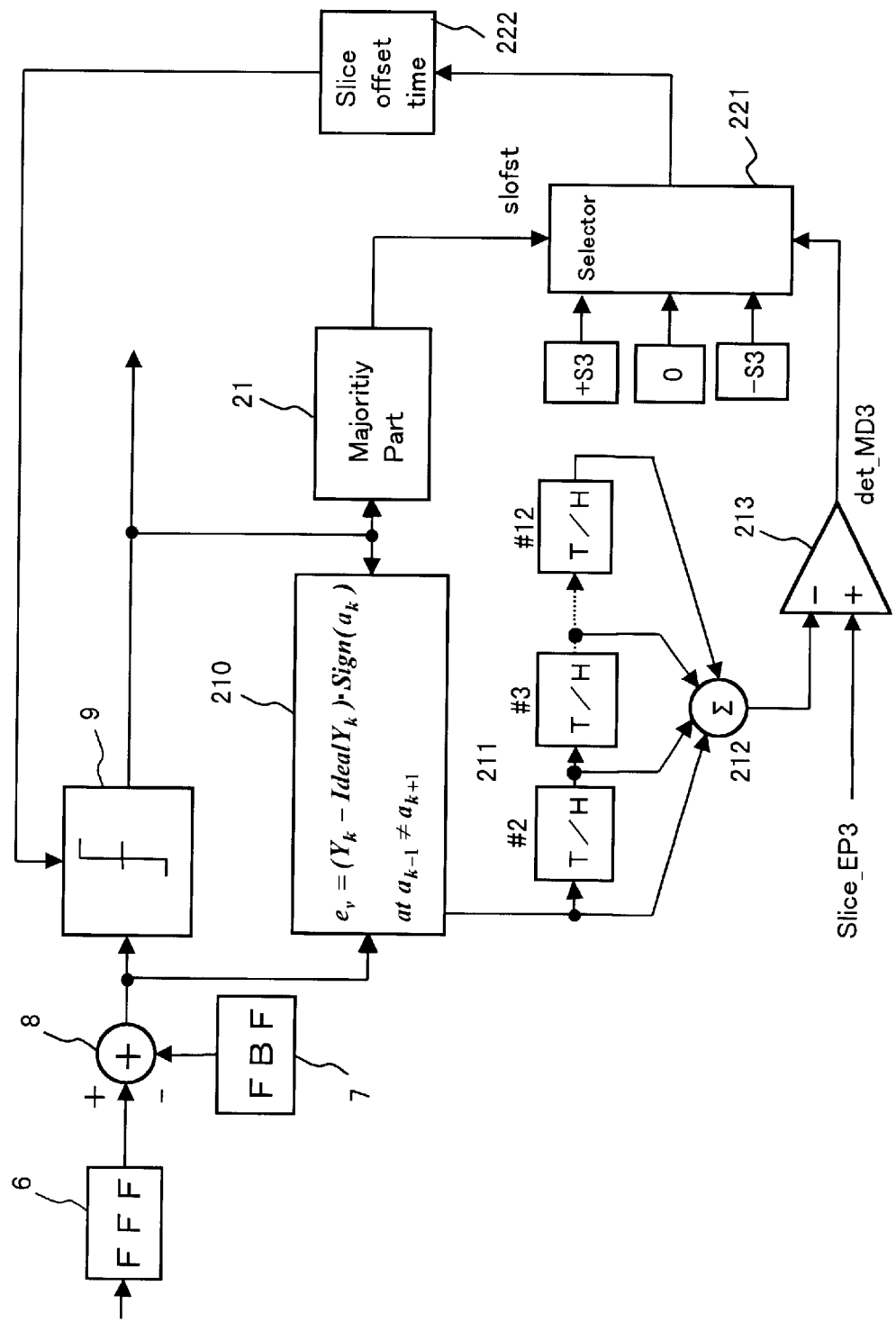
FIG. 8 is a block diagram of the detailed structure corresponding to the embodiment in FIG. 6.

FIG. 8 is a block diagram of the detailed structure corresponding to the embodiment in FIG. 6. The decision result of the comparative decider 9 is inputted to the error propagation detector 20 along with the input signal to the comparative decider 9. The error propagation detector 20 in FIG. 8 has an error computation circuit 210, a delay circuit 211 for delaying the error computation result of the error computation circuit 210 by an amount corresponding to a plurality of samples, and an accumulation circuit 212 for accumulating the error computation results for a plurality of samples from the delay circuit 211.

The error computation circuit 210 computes the oscillation error and outputs it as the error signal ev(k). Specifically, the error propagation detector 20 has the function of performing the computation of Formula (1) described above.

The code of ak is multiplied by the difference (yk−Ideal yk) between the output of the adder 8 when a(k−1)≠a(k+1) and the ideal value when there is no noise, and the product is outputted as the error signal ev from the error computation circuit 210.

The error signal ev computed in this manner is inputted to the delay circuit 211, which determines the value for 12 samples in this embodiment. The sum of the 12 sample values from each tap of the delay circuit 211 is determined by the accumulation circuit 212. Then, a comparator 213 of the error propagation detector 20 compares the output of the accumulation circuit 212 with the error propagation comparison reference (slice EP3).

Error propagation is detected by this comparator 213 (det MD3) when the above-mentioned cumulative value is at or below this comparison reference (slice EP3).

Here, along with the detection of error propagation, the error signal, that is, the input of the comparator 213, is cleared for the 12 samples in order to reset the error propagation detection.

Meanwhile, the decision result of the comparative decider 9 is inputted to the error propagation offset direction detector 21. The error propagation offset direction detector 21 has a majority decision function that serves to detect the offset direction of the input signal due to error propagation.

Figure 9:
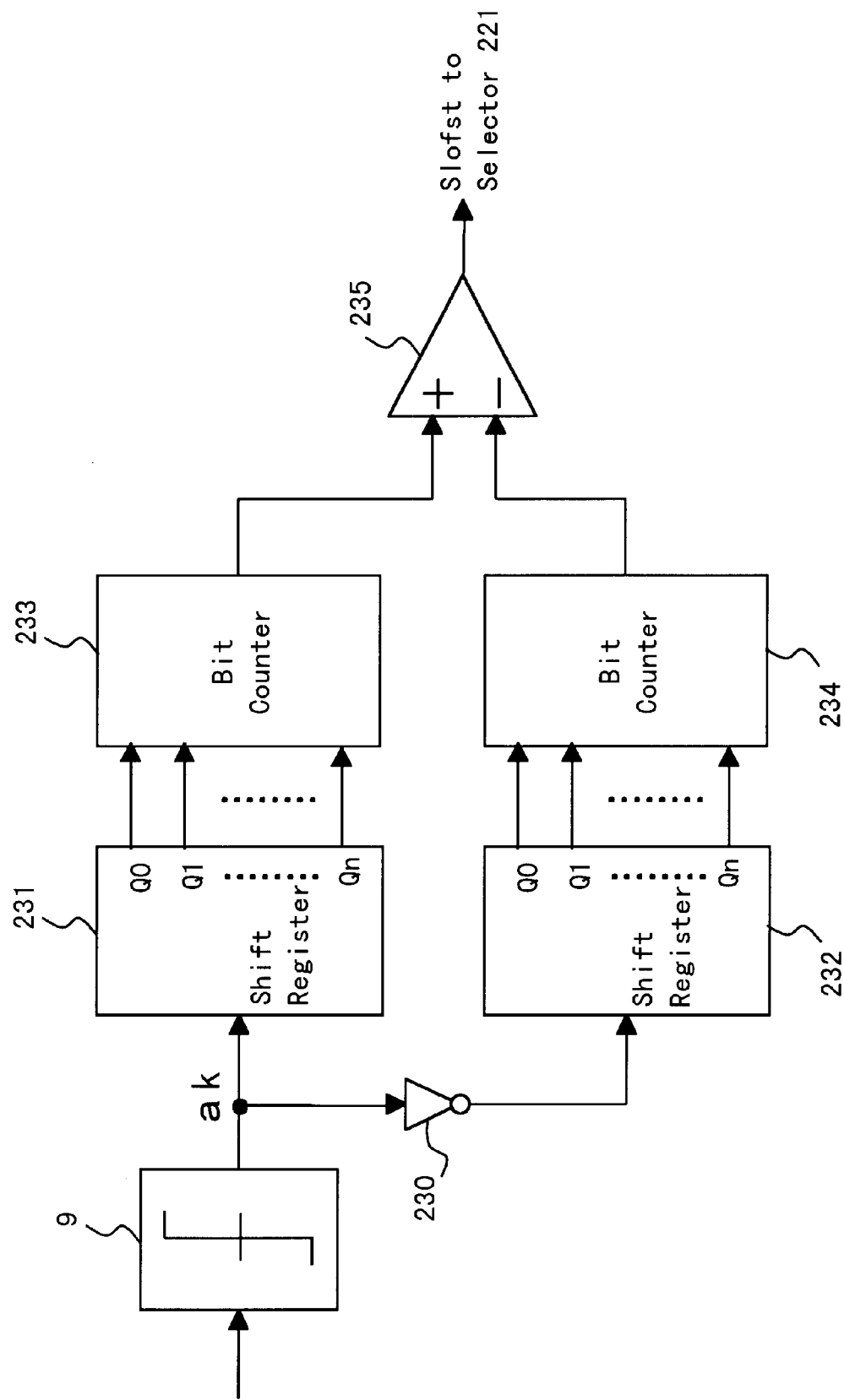
FIG. 9 illustrates an embodiment of an error propagation offset direction detector 21 having a majority decision function.

FIG. 9 illustrates an embodiment of this error propagation offset direction detector 21 having a majority decision function. The output ak of the comparative decider 9, and that which has been inverted by the inverter 230, are inputted to shift registers 231 and 232, respectively. There are also bit counters 233 and 234 corresponding to the shift registers 231 and 232, respectively.

The bit counters 233 and 234 output totals corresponding to the amounts of shift of the shift registers 231 and 232. Therefore, the bit counter 233 totals the number of input "H" logics, and the bit counter 234 totals the number of input "L" logics.

The difference between the outputs of these bit counters 233 and 234 is determined by a difference circuit 235. Therefore, the output (slofst) of the difference circuit 235 signifies whether the offset is in the direction of an input "H" or "L" logic depending on the majority logic.

The majority value is set by the number of levels of the shift registers 231 and 232, and the optimal value thereof should be variable, since it will vary with the signal state (recording density) of the input signal to the MDFE circuit.

Returning to FIG. 8, the output (slofst) of the error propagation offset direction detector 21 is inputted to a selector 221 as a constituent element of the slice offset controller 22.

The selector 221 selects the decider slice level from the logic value table given below on the basis of the output (det

MD3) of the comparator 213 and the output (slofst) of the error propagation offset direction detector 21.

TABLE 1

Selector truth value table

|  |  | det_MD3 | |
| --- | --- | --- | --- |
|  |  | 0 | 1 |
| slofst | 0 | 0 | −S3 |
|  | 1 | 0 | +S3 |

When there is no error propagation (det MD3=0), the selector output is "0," and when error propagation is detected (det #MD3=1) and the majority part output (slofst) is "0," the selector 221 outputs a decider slice level of −S3. Conversely, when the output (slofst) of the majority part (the error propagation offset direction detector 21) is "1," the selector 221 outputs a decider slice level of +S3.

Here, −S3 and +S3 are the desired values by which the decider slice level is to be offset. This selector output is inputted to a slice offset time generator 222 for controlling the timing (offset interval) of the decider slice level. The decider slice level accompanied by the timing signal thus produced is inputted to the comparative decider 9 as a comparison reference signal, which is the slice level of the comparative decision.

Figure 10:
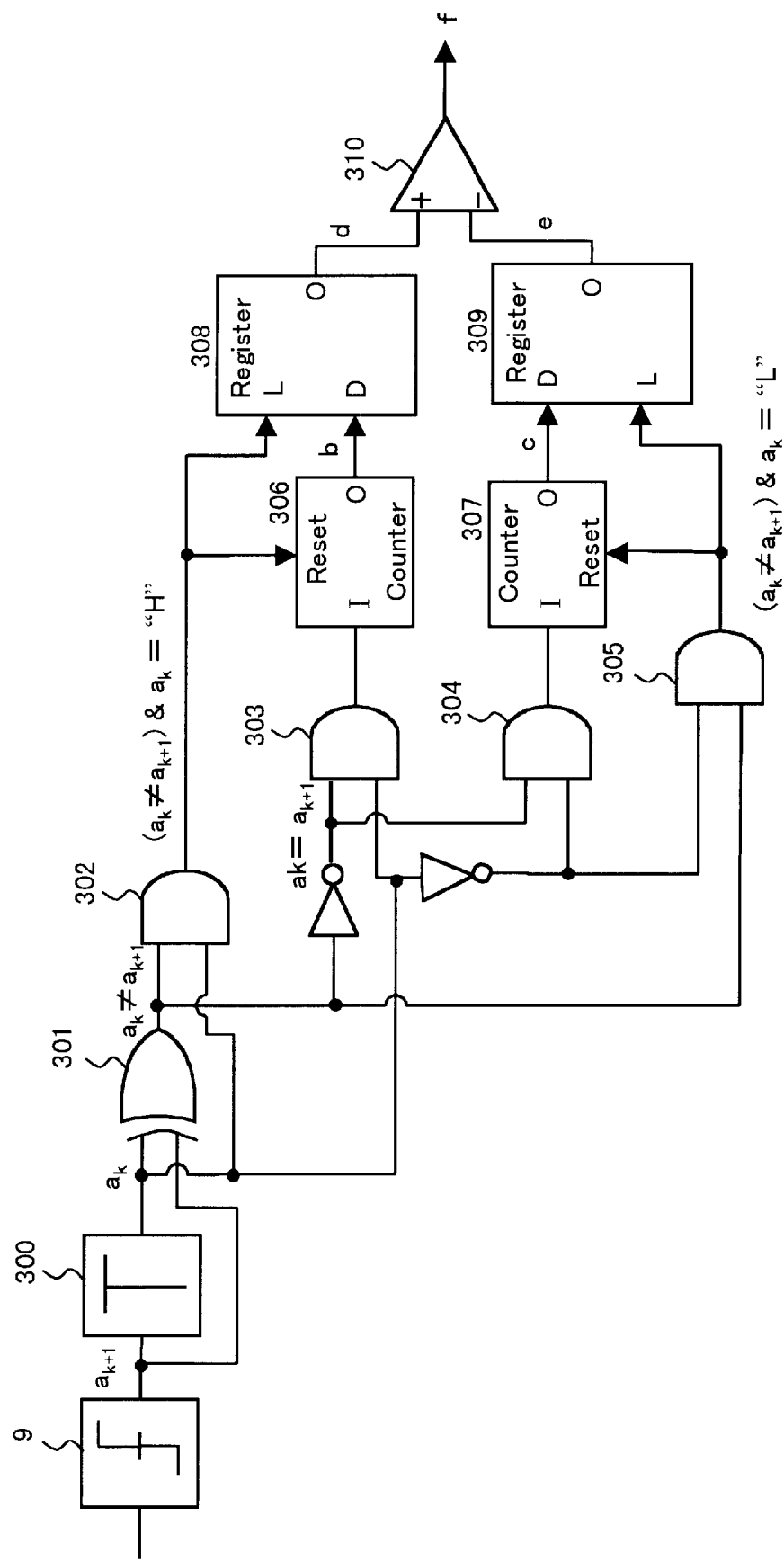
FIG. 10 illustrates another embodiment of an error propagation offset direction detector 21 having a majority decision function.

FIG. 10 is a block diagram of the structure of another embodiment of the majority part of the error propagation offset direction detector 21. Here, there is a function whereby the majority is taken for one cycle of the state transition diagram shown in FIG. 3.

Figure 11:
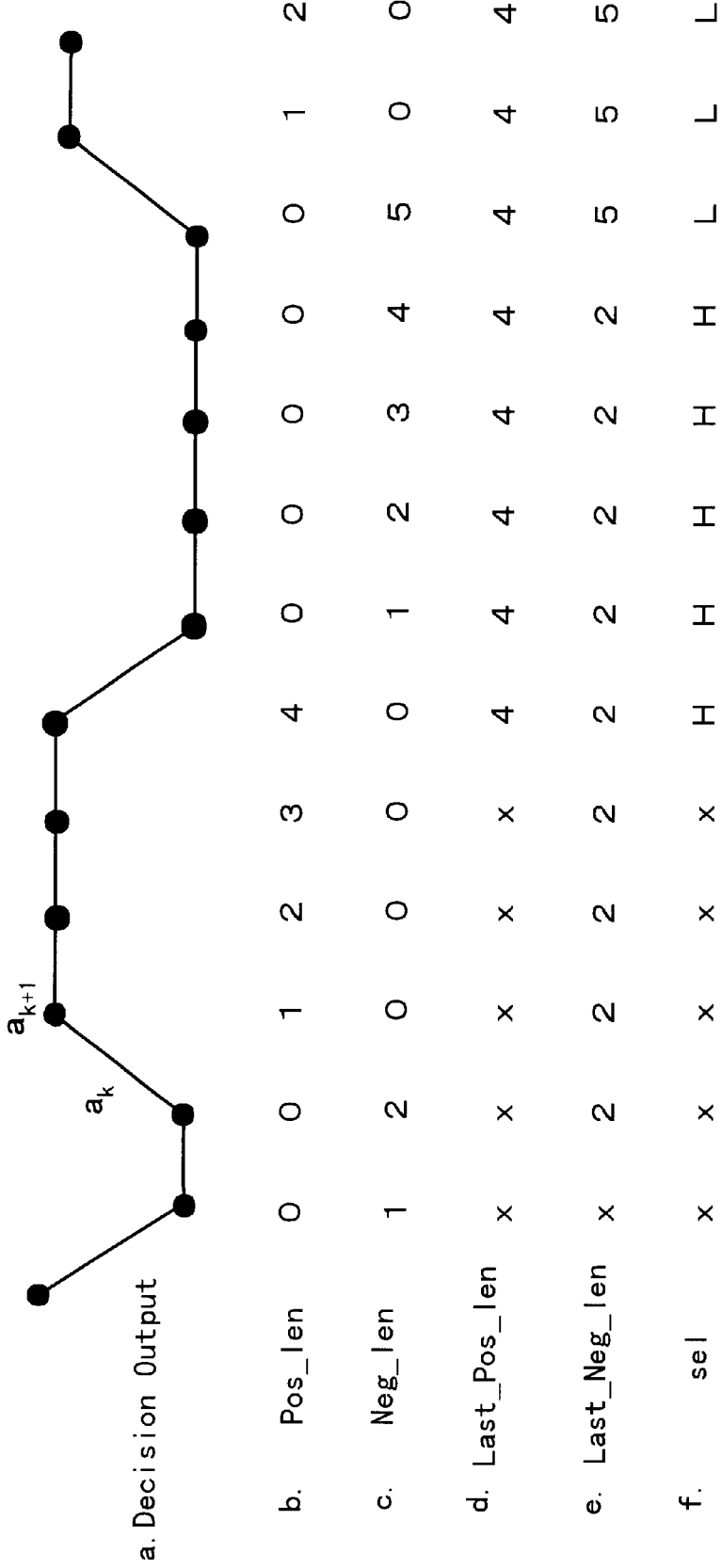
FIG. 11 is a diagram illustrating the operation of the embodiment of FIG. 10.

FIG. 11 is a diagram illustrating the operation of the circuit in the embodiment of FIG. 10. In FIG. 11, the decision output a is outputted from the comparative decider 9. The output of the comparative decider 9 is inputted to a 1-bit delay circuit 300. Therefore, when the output of the 1-bit delay circuit 300 is $a_k$ bit, the input thereof is $a_{k+1}$ bit.

$a_k \neq a_{k+1}$ is detected by an exclusive-OR circuit 301. The output of the exclusive-OR circuit 301 is inputted to AND gates 302 and 305. $a_k$ bit and the inverted input thereof are imparted to the other inputs of the AND gates 302 and 305.

Therefore, the AND gate 302 is ($a_k \neq a_{k+1}$) and detects when ak is the logic "H," while the AND gate 305 is ($a_k \neq a_{k+1}$) and detects when ak is the logic "L."

AND gates 303 and 304 detect when ($a_k = a_{k+1}$) and $a_k$ is the logic "H," and when ($a_k = a_{k+1}$) and ak is the logic "L," respectively.

Counters 306 and 307 are reset by the output of the AND gates 302 and 305, respectively. Therefore, the counter 306 counts the number of continuous logics "H" after the output logic of the comparative decider 9 changes to the logic "H" (FIG. 11b), while the counter 307 counts the number of continuous logics "L" after the output logic of the comparative decider 9 changes to the logic "L" (FIG. 11c).

Registers 308 and 309 hold the count values until the continuous logics of the counters 306 and 307 change (FIGS. 11d and 11e). The outputs of registers 308 and 309 are compared by a comparator 310 and outputted in the offset direction ("H" or "L") (FIG. 11f).

In the embodiment in FIG. 8, a case was described in which the cumulative value of the error signals for 12 samples was determined by the delay circuit 211 and the accumulation circuit 212. The present invention, however, is not limited to this embodiment. Specifically, as described in relation to Formula 1 above, the oscillation error computation result of the circuit 210 may be used directly and compared with the reference value (slice #EP3) by the comparator 213.

Instead of determining the cumulative value, it is also possible to using the integral or average value of the error signals for a plurality of samples of the oscillation error computation result of the circuit 210. In this case, an integrating circuit or averaging circuit is used instead of the delay circuit 211 or accumulation circuit 212, respectively.

When M3DFE is considered, the method for detecting error propagation is basically the same as with MDFE. With M3DFE, however, SNR (signal to noise ratio) is needed more than MDFE in terms of the required BER (bit error rate), so when an MDFE-use error propagation suppression method is used for M3DFE, the burst error length is greater.

Therefore, the error propagation suppression action needs to be improved with M3DFE. Because the cause of error propagation is the DC offset in the input of the decider, DC offset must be detected efficiently in order to enhance the ability to detect error propagation.

Another possible embodiment is therefore to use a structure in which squared DC offset error signals are accumulated for a specific number of signals as indicated by the following formula (2).

$$\varepsilon_{sqDCofst}(n) = \left| \sum_{i=o}^{m} \varepsilon_{sqErr}(n-i) \cdot a(n-i) \right| \quad (2)$$

Here, $\varepsilon_{sqErr}(n)$ is the squared error.

Therefore, in FIG. 8, the structure corresponding to this embodiment is such that $\varepsilon_{sqErr}(n-i) \cdot a(n-i)$ is determined by the computation circuit 210, and $\varepsilon_{sqErr}(n-i)$ a (n−i) is accumulated for m samples by the accumulation circuit 212.

Figure 12A:
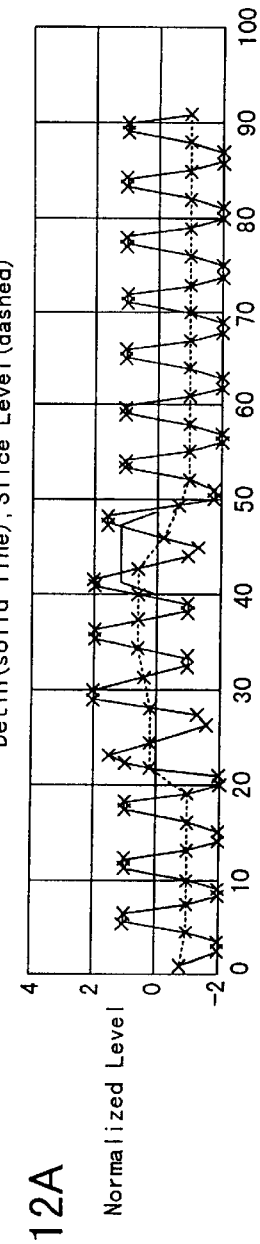
FIGS. 12A through 12C correspond to FIGS. 18A through 18C, and are diagrams of the time series change in the input signal of the comparative decider 9 when the present invention was used.
Figure 12B:
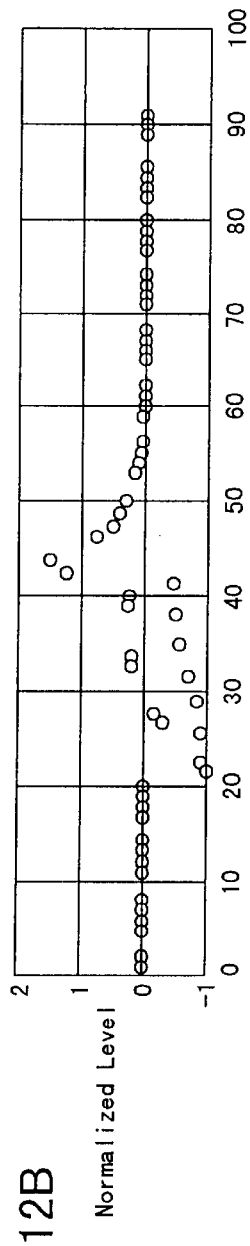
Figure 12C:
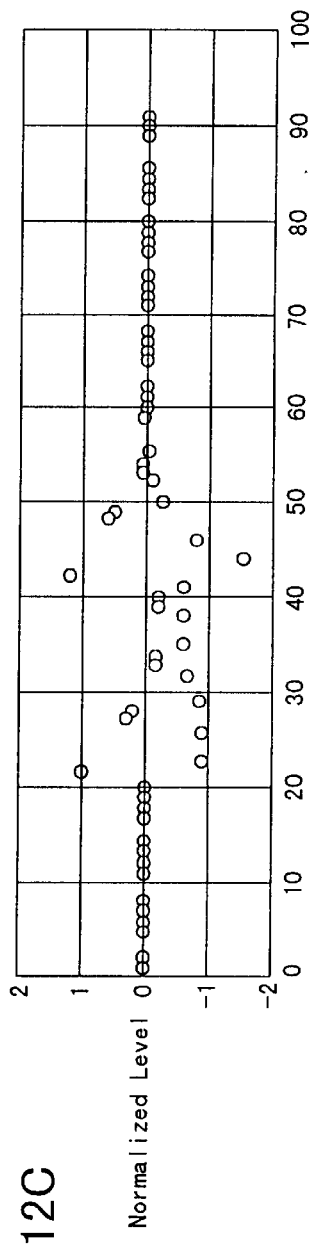
Figure 18A:
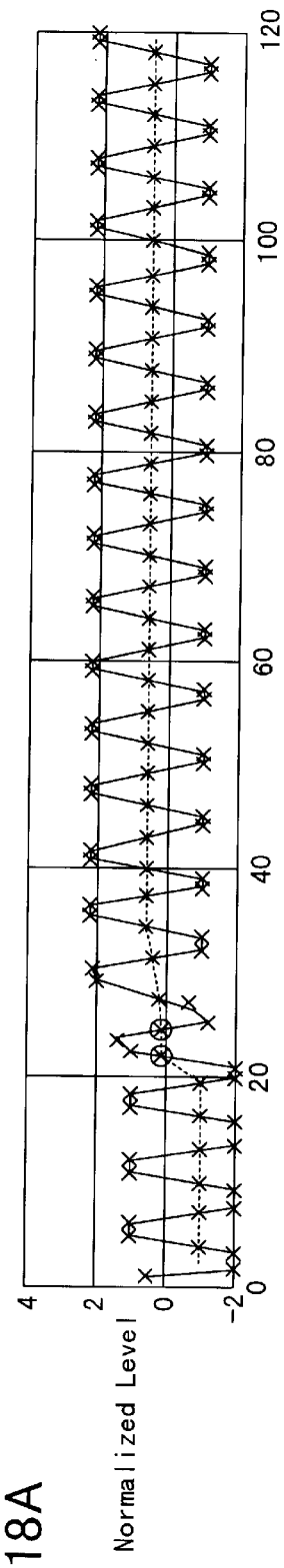
FIGS. 18A through 18C are diagrams illustrating a case when error propagation, which has occurred when the code conversion rule is satisfied, cannot be detected and suppressed.
Figure 18B:
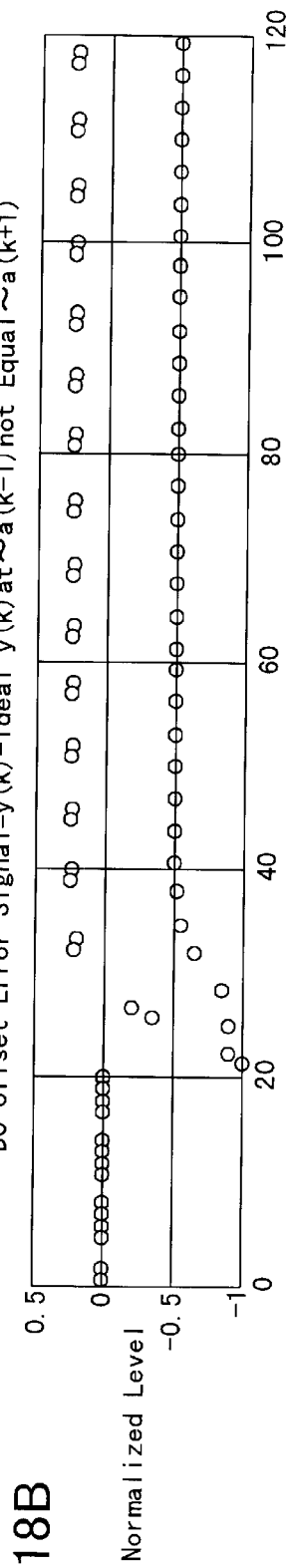
Figure 18C:
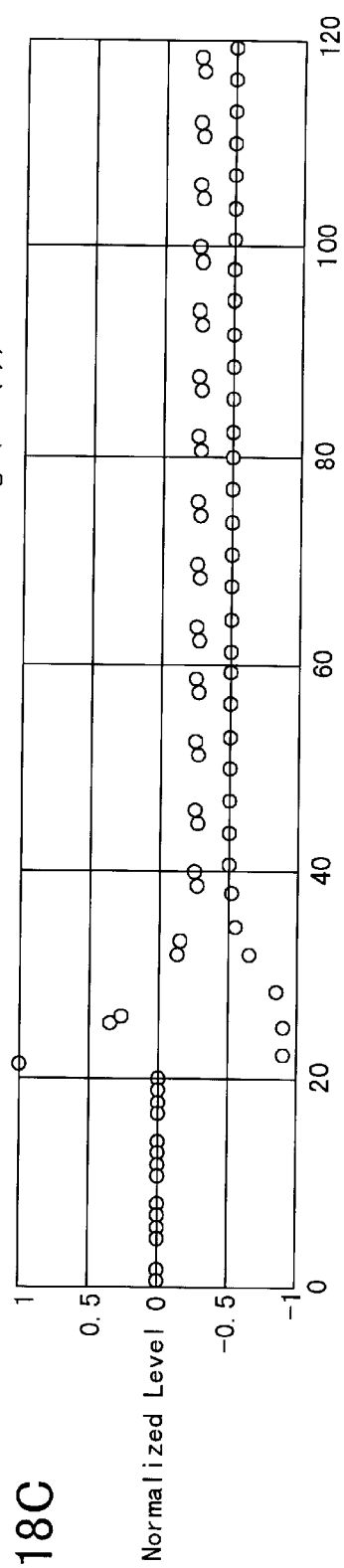

FIGS. 12A through 12C corresponds to FIGS. 18A through 18C, and are diagrams of the time series change in the input signal of the comparative decider 9 when the present invention is used. FIGS. 18A through 18C are diagrams of error propagation when the present invention is not used. In a comparison with FIGS. 18 A through 18C, it can be seen that the error propagation is of infinite length in FIGS. 18 A through 18C, but the error propagation is suppressed in FIG. 12.

Figure 13:
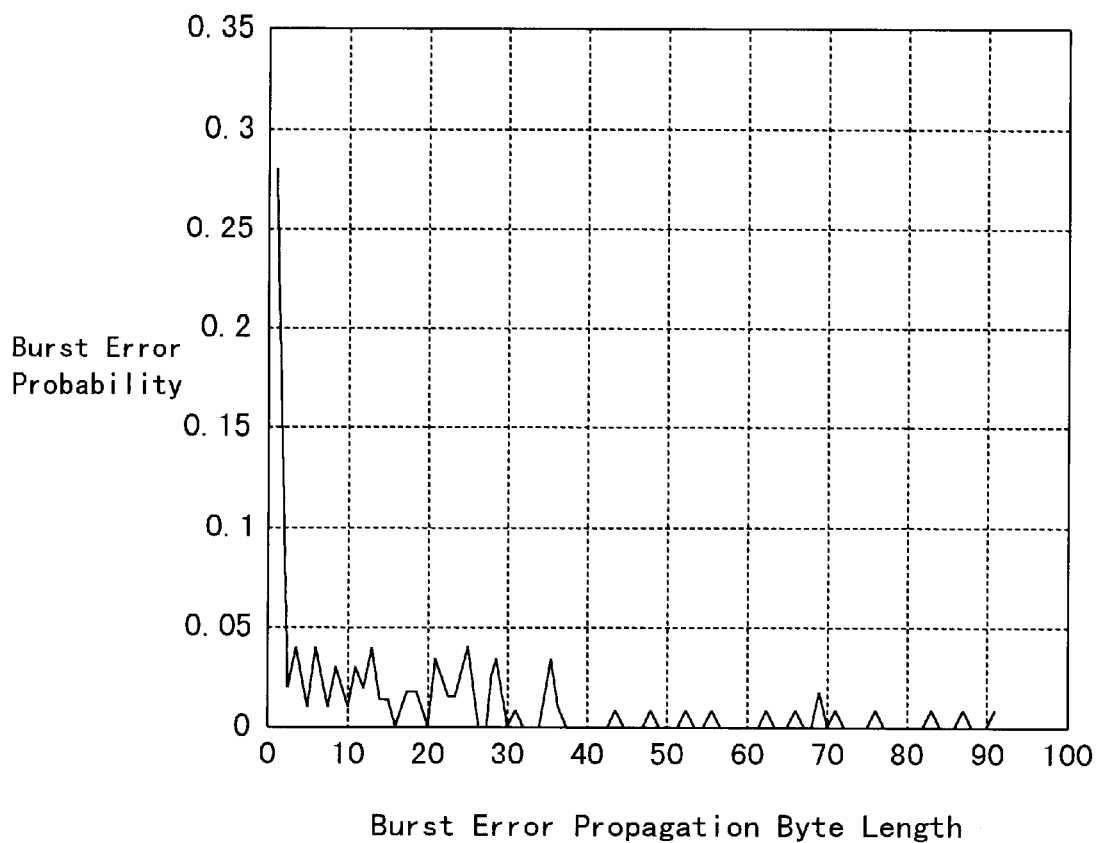
FIG. 13 shows the error propagation byte length and distribution thereof during random noise superimposition when the present invention was not used.
Figure 14:
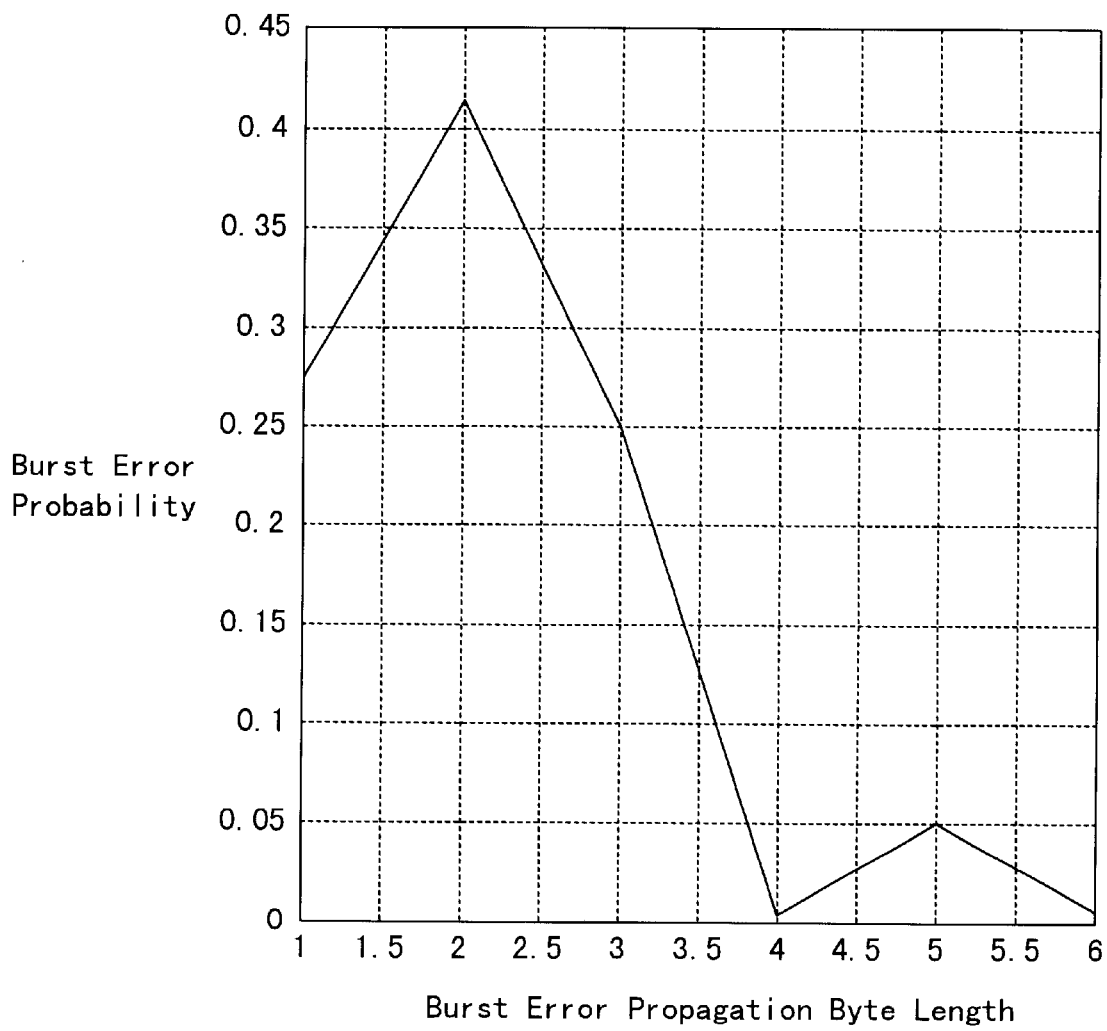
FIG. 14 shows the error propagation byte length and distribution thereof when the present invention was used under the same conditions as in FIGS. 12A through 12C.

FIG. 13 shows the error propagation byte length and distribution thereof during random noise superimposition when the present invention was not used. The data pattern here is "000011," and error propagation is brought about intentionally. FIG. 14 shows the error propagation byte length and distribution thereof when the present invention was used under the same conditions as in FIG. 12.

In a comparison of FIGS. 13 and 14, when the present invention is not used, an error propagation length that was over 90 bytes is suppressed to just 6 bytes, which means that error propagation is kept to a length that can be adequately corrected by an error correction circuit (ECC).

Thus, the present invention makes it possible overcome the error propagation that was the greatest problem with an MDFE system, and to realize a system that enhances the feasibility of MDFE systems, which are considered effective because of their high magnetic recording density.

The embodiments of the present invention described above through reference to the figures are given to facilitate an understanding of the present invention, and the applicability of the present invention is not limited thereby. The scope of protection of the present invention is set forth in the claims, and anything equivalent to the wording of the claims is also encompassed in the scope of protection of the present invention.

What is claimed is:

1. A method for the detection and control of error propagation in multilevel decision feedback equalization in which the output of a comparative decider for deciding the level of an input signal is fed back to the input side through a feedback filter using a slice level as a reference, and the difference signal between said input signal and said feedback signal or a signal produced by inverting said feedback signal and adding it to said input signal is inputted to said comparative decider, the method comprising the steps of:

if the input signal of said comparative decider be y(k) and the output signal of said comparative decider be a binary signal a(k) expressed as ±1, determining an error signal ev(k) expressed by ev(k)=[y(k)−Ideal (k)]·sign [(k)] using a (k−1)≠a(k+1) as an error computation condition;

checking the error signal ev(k) to see whether it exceeds a specific value; and if the error signal e (k) exceeds this specific value, controlling the slice level of said comparative decider to a corresponding offset value.

2. A method for the detection and control of error propagation in multilevel decision feedback equalization in which the output of a comparative decider for deciding the level of an input signal is fed back to the input side through a feedback filter using a slice level as a reference, and the difference signal between said input signal and said feedback signal or a signal produced by inverting said feedback signal and adding it to said input signal is inputted to said comparative decider, the method comprising the steps of:

if the input signal of said comparative decider be y(k) and the output signal of said comparative decider be a binary signal a(k) expressed as ±1, computing an oscillation error signal using a(k−1)≠a(k+1) as an oscillation error computation condition;

checking the oscillation error signal thus determined to see whether it exceeds a specific value; and if the oscillation error signal exceeds this specific value, controlling the slice level of said comparative decider to a corresponding offset value.

3. A method for the detection and control of error propagation in multilevel decision feedback equalization in which the output of a comparative decider for deciding the level of an input signal is fed back to the input side through a feedback filter using a slice level as a reference, and the difference signal between said input signal and said feedback signal or a signal produced by inverting said feedback signal and adding it to said input signal is inputted to said comparative decider, the method comprising the steps of:

determining the squared difference or the difference between said input signal and an ideal signal inferred from the decision results of said comparative decider, determining a signal for which the polarity of the decision results of said comparative decider have been crossed with said squared difference or difference signal;

accumulating said signals, into an accumulated value, for which the polarity of the decision results of said comparative decider have been crossed with said squared difference or difference signal between a plurality of samples; and if an absolute value of said accumulated value exceeds a specific value, controlling the slice level of said comparative decider to a corresponding offset value.

4. A multilevel decision feedback equalization circuit in which the output of a comparative decider for deciding the level of an input signal is fed back to the input side through a feedback filter using a slice level as a reference, and the difference signal between said input signal and said feedback signal or a signal produced by inverting said feedback signal and adding it to said input signal is inputted to said comparative decider, the multilevel decision feedback equalization circuit comprising;

if the input signal of said comparative decider be y(k) and the output signal of said comparative decider be a binary signal a(k) expressed as ±1, a first circuit for determining an error signal ev(k) expressed by ev(k)=[y(k)−Ideal y(k)]·sign[a(k)] using a (k−1)≠a(k+1) as an Error computation condition;

a second circuit for checking the error signal ev(k) thus determined to see whether it exceeds a specific value; and an offset controller for controlling the slice level of said comparative decider to a corresponding offset value if the error signal ev(k) exceeds this specific value.

5. The multilevel decision feedback equalization circuit according to claim 4, wherein said offset controller accumulates, into a cumulative value, said error signals ev(k) for a plurality of samples satisfying the error computation condition a (k−1)≠a(k+1); and if said cumulative value exceeds said specific value, the slice level of said comparative decider is controlled to a corresponding offset value.

6. The multilevel decision feedback equalization circuit according to claim 4, wherein said offset controller averages said error signals ev(k) for a plurality of samples satisfying said error computation condition a (k−1)≠a(k+1); and if said average value exceeds said specific value, the slice level of said comparative decider is controlled to a corresponding offset value.

7. The multilevel decision feedback equalization circuit according to claim 4, wherein said offset controller makes a +1 or −1 majority decision for the output bits from said comparative decider, decides the offset direction of said input signal from the results of deciding said majority, and controls the slice level of said comparative decider to a corresponding offset value in the opposition direction from said decided offset direction.

8. A multilevel decision feedback equalization circuit in which the output of a comparative decider for deciding the level of an input signal is fed back to the input side through a feedback filter using a slice level as a reference, and the difference signal between said input signal and said feedback signal or a signal produced by inverting said feedback signal and adding it to said input signal is inputted to said comparative decider, the multilevel decision feedback equalization circuit comprising:

if the input signal of said comparative decider be y(k) and the output signal of said comparative decider be a binary signal a(k) expressed as +1, a computation circuit for computing an oscillation difference signal using a (k−1)≠a(k+1) as an oscillation error computation condition; and an offset controller for checking said computed oscillation difference signal to see whether it exceeds a specific value, and controlling the slice level of said comparative decider to a corresponding offset value if said oscillation difference signal exceeds this specific value.

9. The multilevel decision feedback equalization circuit according to claim 8, wherein said offset controller accumulates, into a cumulative value, said oscillation difference signals computed using said oscillation difference computation condition for a plurality of samples, and controls the slice level of said comparative decider to a corresponding offset value if said cumulative value exceeds a specific comparison reference value.

10. The multilevel decision feedback equalization circuit according to claim 8, wherein said offset controller averages said oscillation difference signals computed using said oscillation difference computation condition for a plurality of samples, and controls the slice level of said comparative decider to a corresponding offset value if said average value exceeds a specific comparison reference value.

11. The multilevel decision feedback equalization circuit according to claim 8, wherein said offset controller makes a +1 or −1 majority decision for one cycle of output bits from said comparative decider, decides the offset direction of said input signal from the results of deciding said majority, and controls the slice level of said comparative decider to a corresponding offset value in the opposition direction from said decided offset direction.

12. The multilevel decision feedback equalization circuit according to claim 8, wherein said offset controller makes a +1 or −1 majority decision for the output bits from said comparative decider, decides the offset direction of said input signal from the results of deciding said majority, and controls the slice level of said comparative decider to a corresponding offset value in the opposition direction from said decided offset direction.

\* \* \* \* \*